United States Patent [19]
Pinkerton et al.

[11] Patent Number: 5,814,738
[45] Date of Patent: Sep. 29, 1998

[54] FLUID FLOW METER AND MIXER HAVING REMOVABLE AND REPLACEABLE DISPLACEMENT MEMBER

[75] Inventors: Robert N. Pinkerton, Hemet; Stephen A. Ifft, Redlands, both of Calif.

[73] Assignee: McCrometer, Inc., Hemet, Calif.

[21] Appl. No.: 848,887

[22] Filed: May 1, 1997

[51] Int. Cl.[6] .................................................. G01F 1/22
[52] U.S. Cl. ............................... 73/861.55; 73/861.22
[58] Field of Search ........................... 73/861.22, 861.52, 73/861.53, 861.55, 861.57, 861.63, 861.61, 861.58

[56] References Cited

U.S. PATENT DOCUMENTS

| | | |
|---|---|---|
| 613,093 | 10/1898 | Tyson . |
| 1,000,385 | 8/1911 | Eberle . |
| 1,126,275 | 1/1915 | Rice . |
| 1,454,196 | 5/1923 | Trood . |
| 1,535,702 | 4/1925 | Walsh et al. . |
| 1,810,131 | 6/1931 | Daily . |
| 1,942,293 | 1/1934 | Kane ........................................ 48/180 |
| 2,021,092 | 11/1935 | Teliet ......................................... 83/73 |
| 2,068,567 | 1/1937 | Palmer ..................................... 158/118 |
| 2,585,205 | 2/1952 | Young ...................................... 261/76 |
| 2,595,720 | 5/1952 | Snyder ..................................... 261/50 |
| 2,805,966 | 9/1957 | Etheridge ................................. 127/32 |
| 2,942,465 | 6/1960 | Carbone ................................... 73/211 |
| 3,049,009 | 8/1962 | McCall et al. ............................. 73/231 |
| 3,143,401 | 8/1964 | Lambrecht ................................ 48/180 |
| 3,196,680 | 7/1965 | Curran ..................................... 73/213 |
| 3,376,023 | 4/1968 | Lage ........................................... 259/4 |
| 3,467,072 | 9/1969 | Toesca .................................... 123/141 |
| 3,489,396 | 1/1970 | D'Aragon ................................ 261/25 |
| 3,572,117 | 3/1971 | Rodely ..................................... 73/194 |
| 3,671,025 | 6/1972 | Elliott ....................................... 261/76 |
| 3,675,901 | 7/1972 | Rion ........................................... 259/4 |
| 3,733,895 | 5/1973 | Yamamoto et al. ....................... 73/198 |
| 3,759,096 | 9/1973 | White ..................................... 73/194 B |
| 3,968,932 | 7/1976 | Kimmell .................................. 239/142 |
| 4,008,611 | 2/1977 | Turocy .................................. 73/205 R |
| 4,051,204 | 9/1977 | Muller et al. ......................... 261/36 R |
| 4,237,739 | 12/1980 | Owen et al. ......................... 73/861.63 |
| 4,275,841 | 6/1981 | Takeyama et al. ..................... 239/431 |
| 4,299,655 | 11/1981 | Skaugen ................................ 162/343 |
| 4,350,047 | 9/1982 | Dewy, Jr. et al. ................... 73/861.22 |
| 4,491,551 | 1/1985 | Johnson .................................. 261/76 |
| 4,522,151 | 6/1985 | Arbisi et al. ............................ 261/76 |
| 4,576,204 | 3/1986 | Smallhorn et al. ...................... 138/44 |
| 4,638,672 | 1/1987 | McCall ................................ 73/861.52 |
| 4,812,049 | 3/1989 | McCall ................................... 366/174 |
| 4,926,698 | 5/1990 | Owen ................................... 73/861.61 |
| 5,363,699 | 11/1994 | McCall ..................................... 73/198 |
| 5,554,805 | 9/1996 | Bahrton .............................. 73/861.58 |

FOREIGN PATENT DOCUMENTS

| | | |
|---|---|---|
| 752822 | 7/1956 | United Kingdom . |
| 2146781 | 4/1985 | United Kingdom . |

OTHER PUBLICATIONS

"McCrometer Flow Measurement Products–A–Complete Line of Flowmeters for the Municipal Water and Wastewater Industry", Ketema, Inc. 1991, No month.
"V–Cone Meter", Ketema, Inc., 1993. No month.

*Primary Examiner*—Richard Chilcot
*Assistant Examiner*—Harshad Patel
*Attorney, Agent, or Firm*—Juettner Pyle Piontek & Underwood

[57] ABSTRACT

Fluid flow apparatus, such as a fluid flowmeter, a fluid mixing device or a fluid dispersing device, includes a one-piece fluid displacement member removably mounted in a section of fluid conduit so that no material joining, such as welding, is required for manufacture. The displacement member is removably and replaceably mounted in the conduit section so that one displacement member can be replaced by one or more other displacement members and thereby accommodate a very broad range of fluid flows. The mounting or support is provided at the downstream end of the displacement member which eliminates disturbances in the fluid flow around the displacement member and thereby provides for a highly stable signal. The signal is obtained via measurement taps in the wall of the conduit so that no measurement taps are required in or through the displacement member. The apparatus is adapted for use in sanitary applications.

19 Claims, 1 Drawing Sheet

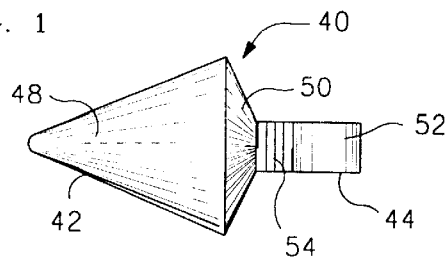
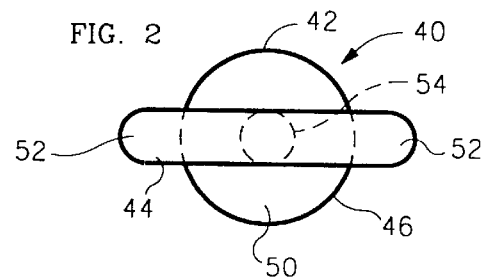
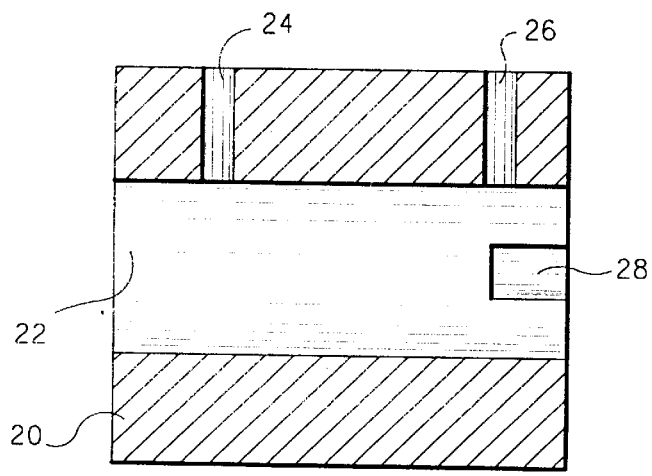
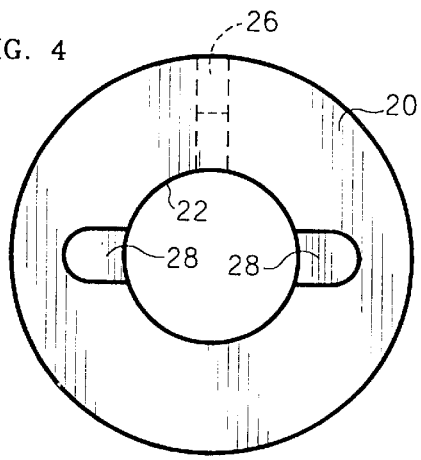
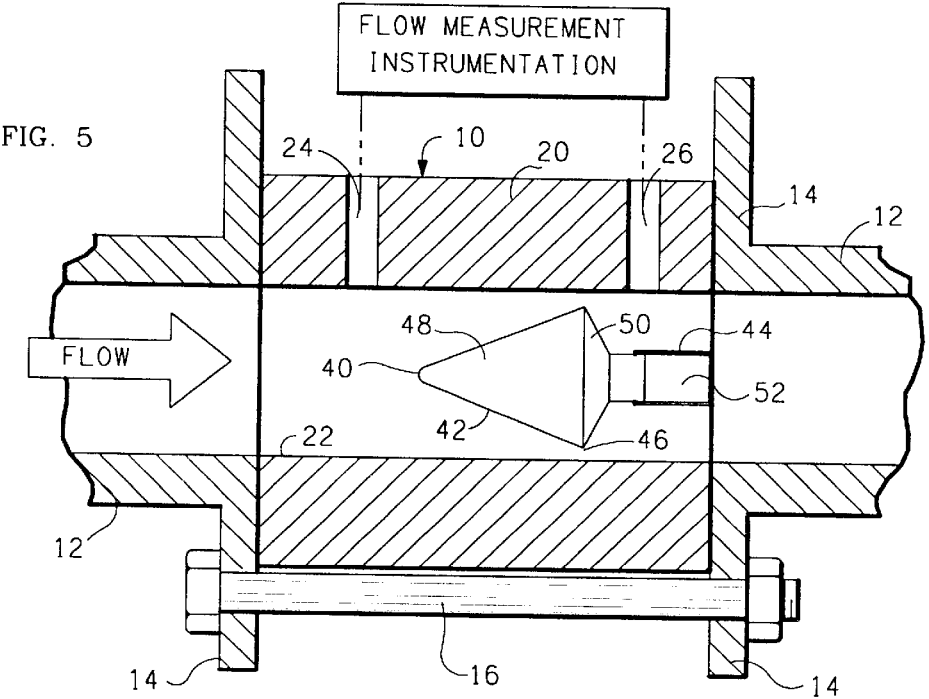

FLUID FLOW METER AND MIXER HAVING REMOVABLE AND REPLACEABLE DISPLACEMENT MEMBER

FIELD OF THE INVENTION

The present invention relates to fluid flow apparatus and, in particular, to fluid flowmeters, fluid mixers and fluid dispersing devices.

BACKGROUND

U.S. Pat. Nos. 4,638,672, 4,812,049 and 5,363,699 disclose fluid flowmeters and fluid dispersing and mixing devices which are characterized by a unique static fluid flow displacement member which is mounted symmetrically within a conduit and which is effective to linearize fluid flow through the conduit within a region defined between the displacement member and the interior surface of the conduit and to flatten the velocity profile of fluid flow in the conduit both upstream and downstream from the displacement member. The apparatus insures reliable measurement of fluid flow conditions within the conduit and also provides for homogeneous blending and dispersing of diverse fluids and/or fluids containing particulate matter.

The unique fluid flowmeters and mixers are made and sold under the registered trademark "V-CONE" by McCrometer, Inc. of Hemet, Calif. which is the owner of the above patents and the assignee of the present invention.

The fluid flow displacement member in the V-CONE devices is comprised of two frustums, usually conical, joined at their larger ends and mounted coaxially in an individualized section of conduit. The frustums are mounted substantially normal to the axis of the section and the direction of fluid flow and with their peripheries spaced symmetrically inwardly from the interior surface of the conduit section. Depending upon the dimensions of the displacement member relative to the size of the conduit section, the displacement member is effective to linearize fluid flow over a predetermined range of flow rates through the section.

The displacement member is made by joining two frustums together at their larger ends, usually by welding. The frustum facing in the upstream direction is customarily joined, e.g., by welding, at its upstream and smaller end to a pipe or tube which extends through the displacement member to its downstream face and through which a pressure reading is taken or through which a secondary fluid is introduced for mixing with a primary fluid flowing through the conduit. The pipe or tube is bent outwardly and extends through the wall of the conduit section upstream from the displacement member. The pipe or tube is joined, e.g., welded, to the wall of the conduit section and conveniently serves as the means for mounting the displacement member coaxially within the section.

Because of the requirements for material joining, manufacture of the "V-CONE" meters and mixers is quite labor intensive. Further, since the mounting pipe or tube is located upstream from the displacement member, it is in a position to introduce anomalies in fluid flow into the region where the velocity of the fluid flow is intended to be linearized.

Also, as presently constructed, a separate flowmeter and its associated flow sensing devices is required for each of the various sizes of flowmeters needed for linearizing and measuring fluid flows over respective ranges of flow rates.

Thus, while the "V-CONE" meters and mixers have heretofore served the needs of industry effectively and efficiently and have met with widespread acceptance and commercial success, there is, as always, room for improvement.

SUMMARY OF THE INVENTION

The object of the invention is to improve in several respects upon the devices disclosed in the above listed patents and the commercial embodiments of the "V-CONE" flowmeters and fluid mixing and dispersing devices.

In a first respect, it is an object of the invention to provide fluid flow devices of the type described that do not require material joining, e.g., that eliminate the need for welding and/or other means of fixedly securing one component or part to another component or part.

In another aspect, it is an object of the invention to accommodate manufacture of the described fluid flow devices from a broader range of materials than heretofore deemed feasible.

In a second respect, it is an object of the invention to provide fluid flow devices of the type described wherein the fluid flow displacement member is removably and replaceably mounted in the conduit section so that a given displacement member can be removed and replaced by one or more different displacement members in order to accommodate different fluids and different ranges of fluid flow through the conduit section. In this way, a single section of conduit, i.e., a single meter body, can be used with a variety of displacement members to accommodate various liquids and gases and a broad range of flows through the meter body.

In a third respect, it is an object of the invention to support the displacement member at a location downstream from the displacement member thereby to eliminate flow disturbances within the region between the meter body and the displacement member. Elimination of disturbances in such region insures a much more uniform and stable fluid flow, and in turn, much more stable, reliable and accurate measurements.

In a fourth respect, it is an object of the invention to provide flow measurement taps through the wall of the conduit section or meter body so that no measurement taps or other holes or passages are required in the displacement member, as was previously required. Attainment of this object contributes to and facilitates attainment of the other objects, and provides fluid flow apparatus that is relatively easy to manufacture and very reliable in operation.

In yet another respect, it is an object of the invention to provide fluid flow devices in which there are no stagnant areas within the devices and wherein fluids are compelled to flow smoothly and continuously through the device without flow stagnation. This, in turn, accommodates the use of the devices in sanitary environments, i.e., in areas and under conditions where sanitation is paramount.

These and other objects and advantages of the invention are attained by virtue of a particular mode of construction of the fluid flow devices, the presently preferred embodiment of which will now be described in conjunction with the accompanying drawings.

BRIEF DESCRIPTION OF THE DRAWINGS

FIG. 1 is a side elevation of a fluid flow displacement member for the preferred embodiment of the invention;

FIG. 2 is a rear elevation of the displacement member;

FIG. 3 is a vertical longitudinal section of a conduit section comprising the meter body for the preferred embodiment of the invention;

FIG. 4 is a rear elevation of the meter body; and

FIG. 5 is a vertical longitudinal section of the preferred embodiment of the invention installed in a pipeline and equipped for use to measure fluid flow, i.e., for use as a fluid flowmeter.

DETAILED DESCRIPTION OF THE PREFERRED EMBODIMENT

The following is a detailed description of a preferred embodiment of a fluid flowmeter presently contemplated by the inventors to be the best mode of carrying out the invention. Modifications and changes therein will become apparent to persons of reasonable skill in the art as the description proceeds.

Referring first to FIG. 5, the fluid flowmeter of the invention, indicated generally at 10, is adapted to be installed in a pipeline or other fluid flow conduit which is depicted as being comprised of pipe sections 12 having bolting flanges 14 at their ends. The flowmeter 10 is comprised of a meter body 20 and a fluid flow displacement device 40 mounted coaxially within the body. The meter body 20 comprises, in essence, a section of pipe or conduit adapted to be bolted or otherwise secured between two sections of pipe, for example, between the flanges 14 of the illustrated pipe sections 12. The meter body is preferably of the so-called wafer design and is simply confined between the flanges 14 and centered or axially aligned with the pipe sections 12 by means of circumferentially spaced bolts 16 (only one shown) extending between and interconnecting the flanges.

The body section 20 has an internal bore or through hole 22 which in use comprises a part of, and constitutes a continuation of the path of fluid flow through, the pipe line 12. As indicated by the arrow, the direction of fluid flow is from left to right as viewed in the drawings. The pipe line 12 and conduit section 20 are usually cylindrical and the bore 22 is usually, though not always, of the same internal cross section and size as the pipe sections 12.

Longitudinally spaced pressure taps 24 and 26 extend radially through the wall of the body 20 at locations and for purposes to be described.

As shown in FIGS. 3 and 4, the interior wall of the body 20 is provided, at the rearward or downstream end thereof, with a plurality of circumferentially spaced, rearwardly open recesses or grooves 28 of limited longitudinal, radial and arcuate extent. In the preferred embodiment, there are two diametrically opposed grooves in the rearward end portion of the meter body.

Referring to FIGS. 1 and 2, the displacement device 40 is comprised of a flow conditioning portion or displacement member 42 and a supporting or mounting portion or member 44.

The flow conditioning or displacement member 42 is comprised of a body, usually cylindrical, which has a major transverse diameter or dimension at edge 46 and two oppositely facing, usually conical, sloped walls 48 and 50 which face, respectively, in the upstream and downstream directions in the meter body 20 and which taper symmetrically inward toward the axis of the body. Except as hereinafter described, the flow conditioning member 42 has essentially the same physical characteristics and functions in essentially the same manner as the flow displacement members utilized in the "V-CONE" devices available from McCrometer, Inc. and those described in U.S. Pat. Nos. 4,638,672, 4,812,049 and 5,363,699, the disclosures of which are incorporated herein as though here set forth in full.

As described in the prior patents, the member 42 is of smaller size than the bore 22 in the conduit 20 and is mounted coaxially within the bore normal to the direction of fluid flow and with the sloped walls 48 and 50 spaced symmetrically inward from the interior or inner surface of the wall of the conduit. The larger and contiguous ends of the sloped walls are of the same size and shape and define at their juncture a sharp peripheral edge 46, the plane of which lies normal to the direction of fluid flow. The upstream wall 48 is longer than the downstream wall 50 and preferably tapers inwardly to a point, or substantially a point, at its upstream end. The wall is formed at an angle in the order of from about 39 degrees to about 75 degrees to the plane defined by the peripheral edge 46, a preferred angle being in the order of about 67.5 degrees. The angle of the downstream wall 50 relative to the plane defined by the edge 46 is within the range of from about 15° to about 30°, a preferred angle being in the order of about 26 degrees. The beta ratio of the member 42 relative to the inner diameter of the conduit 20 is preferably in the order of from about 0.4 up to about 0.94.

As fluid enters the inlet or upstream end of the conduit 20, the fluid is displaced or deflected by the upstream wall 48 of the member 42 into an annular region of progressively decreasing cross sectional area, to a minimum area at the plane of the peripheral edge 46. The fluid then flows into an annular region of progressively increasing area as defined by the downstream wall 50. As a consequence, the fluid flow is stabilized and conditioned both upstream and downstream from the member 42. In particular, the member 42 is effective to linearize fluid flow in the region between the member 42 and the wall of the conduit 20 and to flatten the velocity profile of fluid flow in the conduit both upstream and downstream from the displacement member over a predetermined range of flow rates. Consequently, the flow profile both upstream and downstream is relatively flat, symmetrical, axially centered within the conduit, and of a large and essentially constant mean flow diameter irrespective of flow rate. Also, the fluid or fluids and any solid materials therein are homogenized so that the conduit 20 is filled with an essentially homogeneous mixture throughout substantially its full cross sectional area.

The downstream wall 50 is, in addition, effective to optimize the return velocity of the fluid as it returns to free stream conditions in the conduit downstream from the member. The sharp peripheral edge 46 in conjunction with the downstream wall 50 causes short vortices to be shed from the peripheral edge in the downstream direction. These vortices are of small amplitude and high frequency and thereby contribute to optimization of the return velocity of the fluid flow. Vortices of small amplitude and high frequency effectively eliminate extraneous downstream disturbances or so-called "noise", and thereby facilitate highly accurate and reliable measurements.

For purpose of mounting the member 42 coaxially within the bore 22, the displacement member 42 is provided, pursuant to the present invention, with an integral mounting or support portion or member 44. Specifically, the member 40 is provided at one end thereof with a plurality of circumferentially spaced radially outwardly extending projections or tongues 52 of the same number as and located at the same spacing as the recesses or grooves 28 in the meter body or conduit section 20. In the preferred embodiment, the tongues 52 are provided at the rear or downstream end of the member 40 and are comprised of two diametrically opposed tongues which in effect form a rigid cross bar at the downstream end of the member 40, as is shown in FIG. 2.

Preferably, the cross bar is located a short distance downstream from the sloped wall 50 and is united therewith by a cylindrical extension 54. The extension 54 may be of different lengths for different sizes and shapes of displacement members so as to properly locate the displacement member relative to the measurement taps 24 and 26 as will be described later herein.

As is shown by comparison of FIGS. 2 and 4, the tongues 52 have a radial extent and distal configuration the same as and matching that of the grooves 28 in the meter body. Consequently, the displacement member 40 can be conveniently assembled within the meter body 20 simply by inserting the same into the downstream end of the conduit or bore 22 and causing the tongues 52 to seat firmly and securely within the grooves 28. Upon assembly of the meter body in the pipe line, the flange 14 of the downstream pipe section 12 locks the tongues 52 in place in the grooves 28 and prohibits dislodgement or dislocation of the displacement member 42 relative to the bore 22 of the meter body 20.

When assembled in the body 20, the peripheral edge 46 of the displacement member is located intermediate the two pressure taps 24 and 26 so that the taps are located on opposite sides of the area or plane 46 at which the fluid flow area is the smallest and the velocity of fluid flow is the greatest. The taps communicate respectively with upstream and downstream areas in the conduit where the velocity profile of the fluid flow is relatively flat, linear and stable. This enables highly accurate flow measurements via the taps by means of conventional fluid flow measurement instrumentation connected with the taps, as illustrated schematically in FIG. 5. The apparatus of the invention provides to the measuring instrumentation a highly reliable and stable signal having excellent accuracy.

The upstream measurement tap 24 may be located within an area between the edge 46 and a point about two conduit diameters, i.e., about two times the diameter of the bore 22, upstream from the upstream end of the upstream sloped wall 48. A preferred location is in the area immediately upstream from the pointed end of the wall 48, as illustrated in FIG. 5. The downstream tap 26 may be located within the area between the edge 46 and a point about two conduit diameters downstream from the edge. In particular, the displacement member 42 will cause a vena contracta, i.e., an area of contracted flow, to form in the fluid flow at a predictable or ascertainable distance downstream from the edge 46, and the preferred location for the downstream tap is within the area where the vena contracta occurs. Pressure measurements at these locations, and the differential between the measured pressures, provide information from which flow conditions within the pipe line can be determined and measured by appropriate instrumentation, as depicted schematically in FIG. 5.

The measurement instrumentation customarily includes either or both of a flow totalizing register and/or an instantaneous flow rate indicator. If desired for exceptional accuracy, the taps 24 and 26 may be equipped with solid state or electronic transducers for generating signals which are transmitted to an appropriate processing unit such as a computer or microprocessor. Such instrumentation is not illustrated in the drawings as the same are conventional in the flow measurement industry. With the components described, the overall system accuracy, i.e., the combined accuracy of the hydraulic, mechanical, electrical and/or electronic systems, is 99% or better. All system errors combined are typically within plus or minus 1% of the register or indicator reading. As is known, the totalizing register may provide a reading in gallons, cubic feet, acre feet, cubic meters and other standard measurements. Similarly, the flow rate indicator may provide a reading in gallons per minute, cubic feet per second and other standard measures.

Because the displacement member in the preferred embodiment is supported at a location downstream from the pressure taps 24 and 26, the supporting elements or tongues 52 do not introduce any flow disturbances or anomalies into the region where the taps are located. Fluid flow measurements are taken before the fluid encounters the supports, which contributes further to the reliability, stability and accuracy of flow measurements.

The employment of radial pressure taps 24 and 26 in the conduit section 20 eliminates the prior art need for a conduit extending axially through the displacement member for purposes of measuring the pressure at the downstream side of the member, and in turn eliminates the void and stagnate area of zero fluid flow that existed in such conduit. Consequently, the flow meter of the invention can be utilized for measuring fluid flow in industrial applications where cleanliness and sanitation are of paramount concern. In particular, by utilizing diaphragm type pressure sensors in the two taps, sanitary conditions are assured.

Furthermore, employment of radial pressure taps accommodates manufacture of the displacement member and its support structure as an integral, unitary, solid component, which does not require any material joining, such as welding. Also, the supporting system provided by the tongues 52 and grooves 28 eliminates any need for material joining, e.g., welding, of a support to the member 40 and the wall of the conduit section 20. Consequently, labor costs are significantly reduced.

Also, manufacture of the member 40 as a solid body permits the use of materials of construction not previously deemed suitable for the purpose, for example, plastics, particularly plastics having nonstick properties such as Teflon, Delrin and polytetrafluoroethylene. Additionally, use of such materials of construction permits casting or molding of the displacement member as a unitary component, thereby cutting costs still further.

The displacement member mounting or support system of the invention also facilitates convenient and quick conversion of the device from a first beta ratio to another beta ratio or from a first range of flow rates to other and different ranges of flow rates. Specifically, the size and/or configuration, e.g., slope angles, of the displacement member relative to the bore 22 in the conduit section 20 determines the beta ratio, the type of fluids and the range of flows over which the displacement member is effective to linearize fluid flow through the region between the displacement member and the interior surface of the wall of the conduit. Changes in the size and/or configuration of the displacement member changes the type and ranges of flows to which the system is responsive. Consequently, by removing a first displacement member and replacing it with a different displacement member, the system can be rendered accurately responsive to different flow rates and different fluids. By virtue of the invention, this can be accomplished simply and expeditiously by loosening and removing the bolts 16 that extend between the flanges 14, removing the wafer section 20 from the pipe line, removing the displacement member from the mounting grooves 28 and the conduit 20, replacing the displacement member with a different displacement member, and returning the section 20 to its place in the pipe line 12. Consequently, there is no need to replace a given meter body with an entirely different meter body. One conduit section 20 and its associated sensors will suffice for purposes of measuring fluid flow over a number of ranges of flow rates and a number of different fluids, both liquid and gas.

The objects and advantages of the invention have therefore been shown to be attained in a convenient, practical, economical and facile manner.

While a preferred embodiment of the invention has been herein illustrated and described, it is to be appreciated that various changes, rearrangements and modifications may be made therein without departing from the scope of the invention as defined by the appended claims.

What is claimed is:

1. Fluid flow apparatus comprising, in combination,
   a conduit including a removable and replaceable conduit section having a peripheral wall with an interior surface for conveying fluid therethrough in a given direction, said conduit section having relative to the direction of fluid flow an upstream end and a downstream end,
   a fluid flow displacement member in said conduit section having in relation to the direction of fluid flow an upstream end and a downstream end, said displacement member being of smaller size than said section and having between the ends thereof sloped wall means forming a periphery on said member for deflecting the fluid to flow through a region defined between the periphery of said displacement member and the interior surface of said section, said sloped wall means being effective to substantially linearize the velocity profile of the fluid in at least said region over a predetermined range of flows through said section,
   said displacement member and said section having at one end thereof cooperative means for removably and replaceably mounting said displacement member in said section, whereby said displacement member may be removed and replaced by a different displacement member to accommodate a different range of flows through said section.

2. Fluid flow apparatus as set forth in claim 1 wherein said cooperative means comprises a tongue on said displacement member and a groove in said conduit section, said groove removably receiving said tongue for removably mounting said displacement member in said section.

3. Fluid flow apparatus as set forth in claim 1 wherein said cooperative means is located at the downstream end of said displacement member and said section.

4. Fluid flow apparatus as set forth in claim 1 wherein said conduit section has a plurality of grooves in the interior surface of said section at the downstream end thereof, and said displacement member has a plurality of outwardly extending tongues on its downstream end, said tongues mating with and being removably received in said grooves for mounting said displacement member in said section at the downstream end thereof.

5. Fluid flow apparatus as set forth in claim 1 including flow sensing means associated with said conduit section and constituting therewith a meter body, said displacement member being replaceable by a different displacement member whereby different fluids and different ranges of flows may be measured using a single meter body.

6. Fluid flow apparatus comprising, in combination,
   a conduit for conveying fluid therethrough in a given direction, said conduit having a peripheral wall with an interior surface,
   a fluid flow displacement member in said conduit having in relation to the direction of fluid flow an upstream end and a downstream end, said member being of smaller size than said conduit and having sloped walls forming a periphery on said member for deflecting the fluid to flow through a region defined by the periphery of said displacement member and the interior surface of said conduit, said conduit having relative to the direction of fluid flow an area upstream from said member and an area downstream from said member, said sloped walls being effective to substantially linearize fluid flow in at least said region over a predetermined range of flows through said conduit and to flatten the velocity profile of the fluid flow in said conduit in areas both upstream and downstream from said displacement member,
   said displacement member comprising a unitary member having no areas of physical joinder,
   said displacement member and said conduit having cooperative means for mounting said displacement member in said conduit without permanently joining said displacement member to said conduit,
   the apparatus being constructed and assembled without material joining.

7. Fluid flow apparatus as set forth in claim 6 including flow measurement taps extending through the wall of said conduit and communicating respectively with the upstream and downstream areas where the velocity profile is relatively flat.

8. Fluid flow apparatus as set forth in claim 7 wherein said displacement member is mounted at its downstream end within said conduit downstream of said measurement taps, whereby measurements are taken upstream of said cooperative mounting means and prior to any disturbance of fluid flow that may be caused by said cooperative mounting means.

9. Fluid flow apparatus comprising, in combination,
   a conduit for conveying fluid therethrough in a given direction, said conduit having a peripheral wall with an interior surface,
   a fluid flow displacement member in said conduit having in relation to the direction of fluid flow an upstream end and a downstream end, said member being of smaller size than said conduit and having sloped walls forming a periphery on said member for deflecting the fluid to flow through a region defined by the periphery of said displacement member and the interior surface of said conduit, said conduit having relative to the direction of fluid flow an area upstream from said member and an area downstream from said member, said sloped walls being effective to substantially linearize fluid flow in at least said region over a predetermined range of flows through said conduit and to flatten the velocity profile of fluid flow in said conduit in areas both upstream and downstream from said displacement member, and
   means mounting said displacement member solely adjacent its downstream end within said conduit at a location downstream from said member whereby fluid flow may be measured upstream from said mounting means prior to the occurrence of any disturbance of fluid flow that may be caused by said mounting means.

10. Fluid flow apparatus as set forth in claim 9 including a pair of measurement taps extending through the wall of said conduit, one of said taps communicating with the area in the upstream area in the conduit where the velocity profile of fluid flow is relatively flat and the other communicating with the area in the downstream area in the conduit where the velocity profile of fluid flow is relatively flat, and flow measurement means external to said conduit communicating with the interior of said conduit via said measurement taps.

11. Fluid flow apparatus as set forth in claim 9 wherein said mounting means comprises cooperative means in said conduit and on the downstream end of said displacement member for removably and replaceably mounting said displacement member in said conduit, whereby said displacement member may be removed and replaced by a different displacement member to accommodate different fluids and different ranges of flows through said conduit.

12. Fluid flow apparatus as set forth in claim 11 wherein said displacement member comprises a unitary member having no areas of physical joinder and said cooperative means detachably mounts said displacement member in said conduit without permanently joining said displacement member to said conduit, whereby the apparatus is constructed and assembled without material joining.

13. Fluid flow apparatus as set forth in claim 9 wherein said conduit includes a removable section having an upstream end and a downstream end and a plurality of circumferentially spaced grooves in the interior surface of said section at the downstream end thereof, said displacement member has a plurality of outwardly extending tongues of equal number and spacing on its downstream end, said tongues mating with and being removably received in said grooves for removably and replaceably mounting said displacement member in said section at the downstream end thereof.

14. A fluid flowmeter comprising, in combination, a conduit for conveying fluid therethrough in a given direction, said conduit having a peripheral wall with an interior surface and having in relation to the direction of fluid flow an upstream direction and a downstream direction, a fluid displacement member in said conduit including a first sloped wall portion facing in the upstream direction and tapering inwardly toward the axis of said conduit and a contiguous second sloped wall portion facing in the downstream direction and tapering inwardly toward the axis of said conduit, said sloped wall portions forming a periphery on said member and defining a peripheral edge at the juncture of their larger ends, the second sloped wall portion being of shorter axial extent and greater slope than the first sloped wall portion, said displacement member being mounted coaxially in said conduit with the plane of said peripheral edge substantially normal to the direction of fluid flow and with said sloped wall portions and peripheral edge spaced symmetrically inward from the interior surface of said conduit, said displacement member deflecting the fluid to flow through a region between the periphery of the displacement member and the interior surface of the conduit and being effective to linearize fluid flow in said region and to flatten the velocity profile of fluid flow in areas within the conduit both upstream and downstream from the displacement member, a first pressure tap extending through the wall of the conduit in the area upstream from said edge where the velocity profile of the fluid is relatively flat, and a second pressure tap extending through the wall of the conduit in the area downstream from said edge where the velocity profile of the fluid is relatively flat, said first and second pressure taps facilitating determination of the fluid pressure differential between the upstream and downstream sides of said edge for the purposes of measuring fluid flow through the conduit without requiring a pressure tap within said displacement member.

15. A fluid flowmeter as set forth in claim 14 wherein the first pressure tap is located within an area between said edge and a location about two conduit diameters upstream from said first sloped wall portion, and the second pressure tap is located within an area between said edge and a location about two conduit diameters downstream from said edge.

16. A fluid flowmeter as set forth in claim 15 wherein said first sloped wall portion tapers substantially to a point in the upstream direction and said first pressure tap is located in the area immediately upstream from said point.

17. A fluid flowmeter as set forth in claim 15 wherein said displacement member produces a vena contracta in the fluid flow downstream from said edge and said second pressure tap is located in the area where the vena contracta occurs.

18. A fluid flowmeter as set forth in claim 14 wherein said first sloped wall portion has a slope angle of from about 39° to about 75° to the plane of the peripheral edge, said second sloped wall portion has a slope angle of from about 15° to about 30° to the plane of the peripheral edge, and the beta ratio of the displacement member relatively to the inner surface of the conduit is in the order of from about 0.4 up to about 0.94.

19. A fluid flowmeter as set forth in claim 18, including means for removably and replaceably mounting said displacement member in said conduit, said displacement member being removable and replaceable by a displacement member of different size or different configuration to accommodate different fluids and different flow rates through the conduit and to facilitate use in said conduit of displacement members providing different beta ratios.

* * * * *